US012752247B1

(12) United States Patent
Arribau

(10) Patent No.: US 12,752,247 B1
(45) **Date of Patent: *Oct. 6, 2026**

(54) DIRECT HIGH PRESSURE SLURRY INJECTION FRACTURING SYSTEM AND METHOD

(71) Applicant: CONDOR INTERNATIONAL LIMITED PARTNERSHIP, RLLLP, Englewood, CO (US)

(72) Inventor: Jorge O. Arribau, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/083,779

(22) Filed: Mar. 19, 2025

Related U.S. Application Data

(60) Provisional application No. 63/568,784, filed on Mar. 22, 2024.

(51) Int. Cl.

| | |
|---|---|
| ***B01F 23/50*** | (2022.01) |
| ***B01F 35/71*** | (2022.01) |
| ***B01F 35/75*** | (2022.01) |
| ***B01F 101/49*** | (2022.01) |
| ***E21B 43/26*** | (2006.01) |

(52) U.S. Cl.
CPC ............ *B01F 23/59* (2022.01); *B01F 35/712* (2022.01); *B01F 35/718051* (2022.01); *B01F 35/7544* (2022.01); *B01F 35/75471* (2022.01); *E21B 43/2607* (2020.05); *B01F 2101/49* (2022.01)

(58) Field of Classification Search
CPC .................................................. E21B 43/2607
See application file for complete search history.

(56) References Cited

U.S. PATENT DOCUMENTS

| | | | |
|---|---|---|---|
| 8,127,844 B2 | 3/2012 | Luharuka et al. | |
| 9,133,701 B2 | 9/2015 | Luharuka et al. | |
| 9,291,038 B2 * | 3/2016 | Dotson | E21B 43/114 |
| 9,790,775 B2 | 10/2017 | Joseph et al. | |
| 10,837,465 B2 * | 11/2020 | Oklejas, Jr. | E21B 43/2607 |
| 10,900,318 B2 * | 1/2021 | Lewis | E21B 43/2607 |
| 10,920,555 B2 | 2/2021 | Procita et al. | |
| 10,975,677 B2 * | 4/2021 | Shampine | E21B 43/261 |
| 11,428,058 B2 | 8/2022 | Haiderer et al. | |
| 11,572,899 B2 * | 2/2023 | Hauge | E21B 43/2607 |
| 11,629,582 B2 * | 4/2023 | Arribau | B01F 23/50 166/250.01 |
| 2004/0218464 A1 | 11/2004 | Arribau et al. | |
| 2009/0301725 A1 | 12/2009 | Case et al. | |
| 2010/0243251 A1 | 9/2010 | Luharuka et al. | |
| 2011/0272158 A1 | 11/2011 | Neal | |
| 2018/0030968 A1 | 2/2018 | Verma et al. | |
| 2020/0063545 A1 | 2/2020 | Shampine | |
| 2020/0149380 A1 | 5/2020 | Procita et al. | |

FOREIGN PATENT DOCUMENTS

| | | |
|---|---|---|
| CA | 2696248 C | 9/2010 |

* cited by examiner

*Primary Examiner* — Tara Schimpf
*Assistant Examiner* — Daniel T Craig
(74) *Attorney, Agent, or Firm* — Reilly Intellectual Property Law Firm

(57) ABSTRACT

A dual chamber assembly for injecting high pressure slurry into a wellhead by displacing it from chambers with pressurized clean fluid from frac pumps, while reducing the number of high-pressure pumps exposed to abrasive slurries.

15 Claims, 3 Drawing Sheets

DIRECT HIGH PRESSURE SLURRY INJECTION FRACTURING SYSTEM AND METHOD

CROSS REFERENCE TO RELATED APPLICATIONS

This application claims priority to and claims the benefit of U.S. Provisional Application No. 63/568,784 filed Mar. 22, 2024, titled "Direct High Pressure Slurry Injection Fracturing System", the entire contents of which are hereby expressly incorporated herein by this reference including, without limitation, the specification, claims and abstract, as well as any figures, tables, or drawings thereof.

TECHNICAL FIELD

The subject matter disclosed herein is generally directed to pressurizing slurry for oil and gas extraction operations; and more particularly relates to an apparatus and method for pressurizing and displacing liquid with solid particles using two fluid streams, one of which is discharged directly from a clean fluid tank to a frac pump.

BACKGROUND

A hydraulic fracturing ("frac") job consists of the delivery of great quantities of a fluid (water or oil based) into a well at pressures of up to 15,000 psi in order to fracture the reservoir rock, thus creating drainage channels for the oil and or gas trapped in the formation to flow to the wellbore. To keep the channels open once the well is opened to allow the oil or gas to flow, a proppant such as sand, ceramics, bauxite, or others is added to the fluid injected in the well. The sand concentration of the fluid can vary from ½ lb. per gallon to 21 lbs. per gallon. It is not unusual for a frac job to inject 5,000,000 gals. of water and 15,000,000 lbs. of sand. To perform a frac job, large sand and water storage tanks are connected to a blender unit. The blender draws the fluid from the tanks and the sand from the storage bins through conveyor belts. As the blender mixes the water and sand, it may also add other chemicals, and delivers this mixture to the fixed displacement plunger pumps (frac pumps), at pressures between 50 and 120 psi, to be injected in the well at whatever pressure and rate is required to fracture the formation; anywhere between 3,000 and 15,000 psi.

The pumping of such a high volume of sand and water slurry results in a rapid wearing of pump valves, seats, fluid ends, packing and plungers and this is the most expensive aspect of any frac job. Without including the labor required to replace failed components during operations, the cost to maintain a frac pump may be as high as $300,000 per year on fluid ends, plungers, seats, and valves replacements due to sand or other proppants erosion. Furthermore, due to these failures additional units must be dispatched to the job location as back-up for the units that must be taken off the line for repairs. As a result, substantial savings in operating expenses and capital equipment are to be had if sand is not introduced into the frac pumps.

Current systems utilize at least two high pressure cylinders or chambers that receive slurry from a blender which is then pressurized and flows to the cylinders while recirculating clean fluid. The two cylinders, if placed between the fixed displacement pumps and the discharge point of the slurry, will keep the abrasive solids away from the fixed displacement pumps. In this form, both cylinders fill with clean fluid that recirculates during the operation of the system. Should the fluid become contaminated with sand, lose volume through evaporation or incomplete seals and leakage, or overheat, the system must be shut down in order to refill the cylinders with clean fluid that will be injected in to the well once the pumping is resumed. One solution is to use split-fluid fracturing which uses two fluid streams, (1) a highly concentrated slurry and (2) a clean fluid, sent to separate groups of high-pressure pumps. Reducing the number of high-pressure pumps exposed to abrasive slurries extends pump and equipment life. Centrifugal pumps at the fracturing-fluid supply send water to the blender and also boost the clean fluid high pressure pumps directly. Chemical additives, such as friction reducers, can be added to the clean fluid at the blender. The highly concentrated slurry and the clean fluid are mixed together in the high-pressure line that goes into the well. The resulting fluid-proppant concentration is monitored by a densitometer at the blender or a high-pressure densitometer at the well head.

It is an object to pressurize slurry while maintaining the integrity of the mechanical components during operation.

It is another object to prevent contamination of the clean fluid as it passes through the system.

It is a further object to prevent the fluid reduction that may occur with clean fluid recirculation.

SUMMARY

In one exemplary aspect, the apparatus is comprised of an apparatus for pressurizing and intermixing sand and fluid using a blender and frac pumps for discharge into a wellhead, the apparatus has at least one pair of pressure chambers, each of first and second chambers adapted for vertical or semi-horizontal orientation, at least one inlet line secured at a first end of each of the first chamber and the second chamber and in fluid communication with the blender, at least one high pressure outlet line secured at the first end of each of the first chamber and the second chamber and in fluid communication with the wellhead, at least one clean fluid outlet line secured to a second end of each the first chamber and the second chamber, at least one high pressure clean fluid inlet line secured to the second end of each of the first and the second chamber and to a slurry displacing frac pump, first valve members operatively connected to each of the inlet lines and each of the high pressure outlet lines proximal to the first end of each of the first chamber and the second chamber, second valve members operatively connected to each of the outlet lines and each of the high pressure inlet lines proximal to the second end of each of the first chamber and the second chamber, and flow meters mechanically connected to each of the second end outlet lines and operatively connected to a logic control unit including at least one valve actuator.

There is also a method of pressurizing and discharging slurry into a wellhead, the steps comprising filling a first vertical or semi-vertical chamber, a second vertical or semi-vertical chamber and a frac pump with clean fluid, injecting slurry sequentially into a lower portion of the first chamber and the second chamber and sequentially displacing clean fluid from the first and second chamber into a storage tank, measuring the flow of displaced clean fluid from the first and second chamber into the storage tank with a flow meter, injecting pressurized clean fluid from the frac pump into the first and second chamber, and discharging slurry sequentially from a lower portion of the first and second chamber through a high pressure slurry line into a wellhead. The steps further include injecting clean fluid from a slurry displacing frac pump to a clean fluid frac pump and discharging high pressure clean fluid into the high pressure slurry line.

The two identical high-pressure chambers, capped with high pressure flanges, placed vertically, or at an angle no lower than 30 degrees from the horizontal, will receive the slurry from the high density sand mixing blender and pressurized clean fluid from the frac pumps without the slurry ever reaching the valves and seats of the frac pumps. The valves on the lines connected to the top of each vessel are further mechanically connected to an actuator to ensure that all four valves move simultaneously. A logic control unit will read the low-pressure volume exiting the vessel being filled with slurry and at a preset volume it will operate the valves actuator and reverse the high-pressure flow to the other vessel and its slurry intake. The opposite will occur in the other vessel. The use of clean fluid with the frac pumps will keep the abrasive solids away from the pumps. This will result in savings on valves and fluid ends in hydraulic fracturing operations due to less wear and tear on the equipment and may also be useful in other slurry pumping operations such as disposal of contaminants as well as dangerous and radioactive fluids.

In another exemplary aspect there is a method for blending liquids and solid particles by counterflow of the liquid to prevent contact with the frac pumps and seats.

In addition to the method and articles of manufacture described above, further aspects and embodiments will become apparent by reference to the drawings and by study of the following descriptions. Exemplary embodiments are illustrated in reference to Figures of the drawings. It is intended that the embodiments and Figures disclosed herein are to be considered illustrative rather than limiting.

BRIEF DESCRIPTION OF THE DRAWINGS

An understanding of the features and advantages of the present invention will be obtained by reference to the following detailed description that sets forth illustrative embodiments, in which the principles of the invention may be utilized, and the accompanying drawings of which.

The figures herein are for illustrative purposes only and are not necessarily drawn to scale.

DETAILED DESCRIPTION

The embodiments disclosed herein relate to the apparatus and method as further described below.

Standard techniques related to making and using aspects of the invention may or may not be described in detail herein. Various aspects of manufacturing equipment for fracturing to implement the various technical features described herein may be well known.

Figure 1:
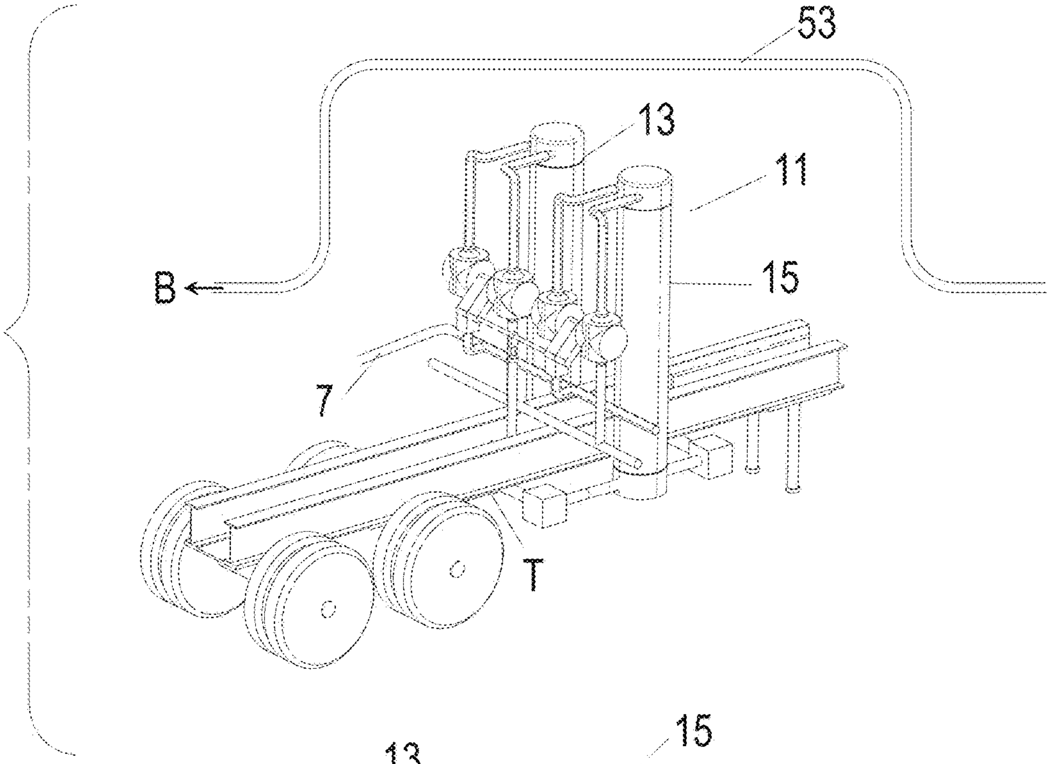
FIG. 1 is a side perspective view of a truck mounted assembly of a slurry injection fracturing system.

Referring in more detail to FIG. 1, in oil and gas operations, such as, fracturing, the unit or assembly 11 is mounted on a truck bed T including a high density sand mixing blender 12 for mixing solid particulate matter, such as, sand which is to be thoroughly mixed with a liquid which is then introduced through a low pressure slurry line (LPSL) 17 to the unit for pressurization and eventual delivery to a well head. While the apparatus is described and shown as being truck-mounted, it will be appreciated that it can be mounted on a fixed support and be oriented vertically or canted at an angle.

The assembly comprises at least two chambers 13 and 15 capable of withstanding high pressures to be placed vertically, or at an angle no lower than 30 degrees from the ground, between the blender unit 12 and at least one slurry displacing frac pump (SDFP) and clean fluid frac pump (CFFP). The chambers are adapted to withstand at least 15,000 psi of working pressure and are preferably fabricated of large diameter seamless tubing such as steel tubing or hollow helical strand (HHS) tubing of approximately 20 inches in diameter with a preferable wall thickness of 1.417 and a height of approximately 100.1 inches having first or upper ends 8, 9 and second or lower ends 27, 29 that seal the at least two chambers 13, 15. The upper and lower ends 8, 9 and 27, 29 of the chambers include high pressure flanges 16 and stub ends or caps (not shown) for sealing opposite ends of the chambers.

The chambers 13, 15 are trailer mounted for easy portability between sites. Each chamber 13, 15 has a lower inlet 19, 23 and a lower outlet 21, 25 along the first or lower end 27, 29 of each chamber. The lower inlets 19, 23 and lower outlets 21, 25 are 3 inches or greater in diameter to facilitate fluid transfer to be discussed in more detail and are secured to the chambers 13, 15 proximal to the cap ends at the lower end 27, 29. The lower inlets 19 and 23 are fluidly connected to the blender system B through the low pressure slurry line (LPSL) 17 and lower outlets 21, 25 are fluidly connected to the wellhead W through a high pressure slurry line (HPSL) 31. The fluid-proppant concentration may be monitored by a densitometer (not shown) at the blender or a high-pressure densitometer (not shown) at the well head. The lines are preferably at least 3 inch steel tubing and check valve members 33, 35, 37 and 39, being the type of standard valves and seats used on the suction and discharge of frac pumps, are located inline on the lower inlets 19, 23 and lower outlets 21, 25 to regulate fluid flow to and from the chambers. High pressure runs or lines are preferably used for the assembly with the exception of the low pressure slurry line 17 up to the check valve members 33, 37 as well as low pressure fluid line 53, to be described in more detail. Other configuration of lines may be used without departing from the scope of the disclosure. The valves may be ball valves but sliding gate valves or sliding cylinders may also be used without departing from the scope of the disclosure.

Figure 2:
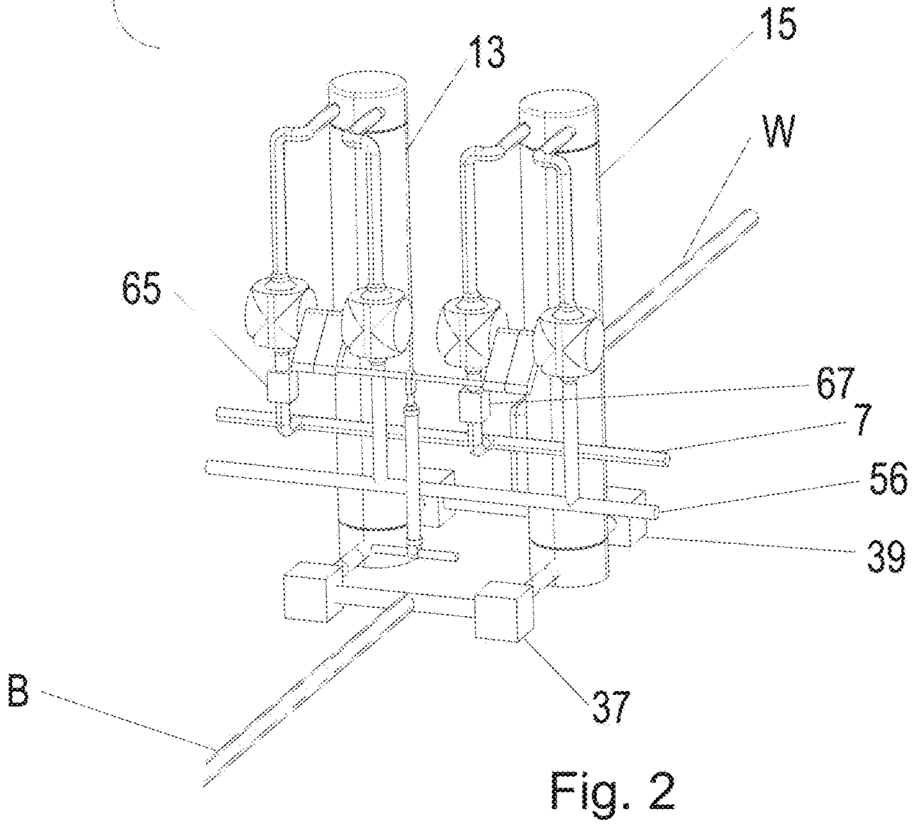
FIG. 2 is a front perspective view of the assembly without the truck as shown in FIG. 1.
Figure 3:
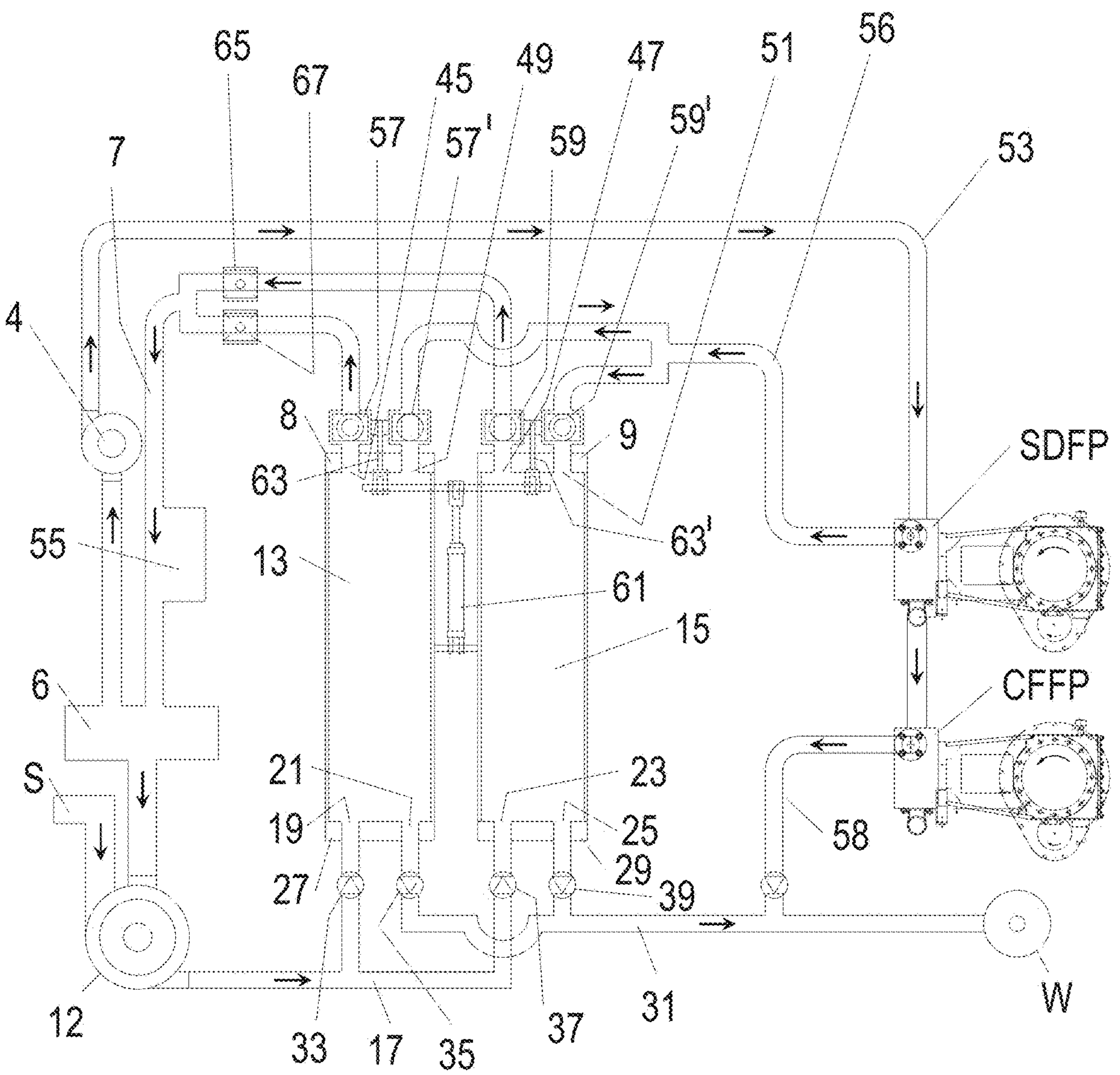
FIG. 3 is a schematic view of FIG. 2.
Figure 4:
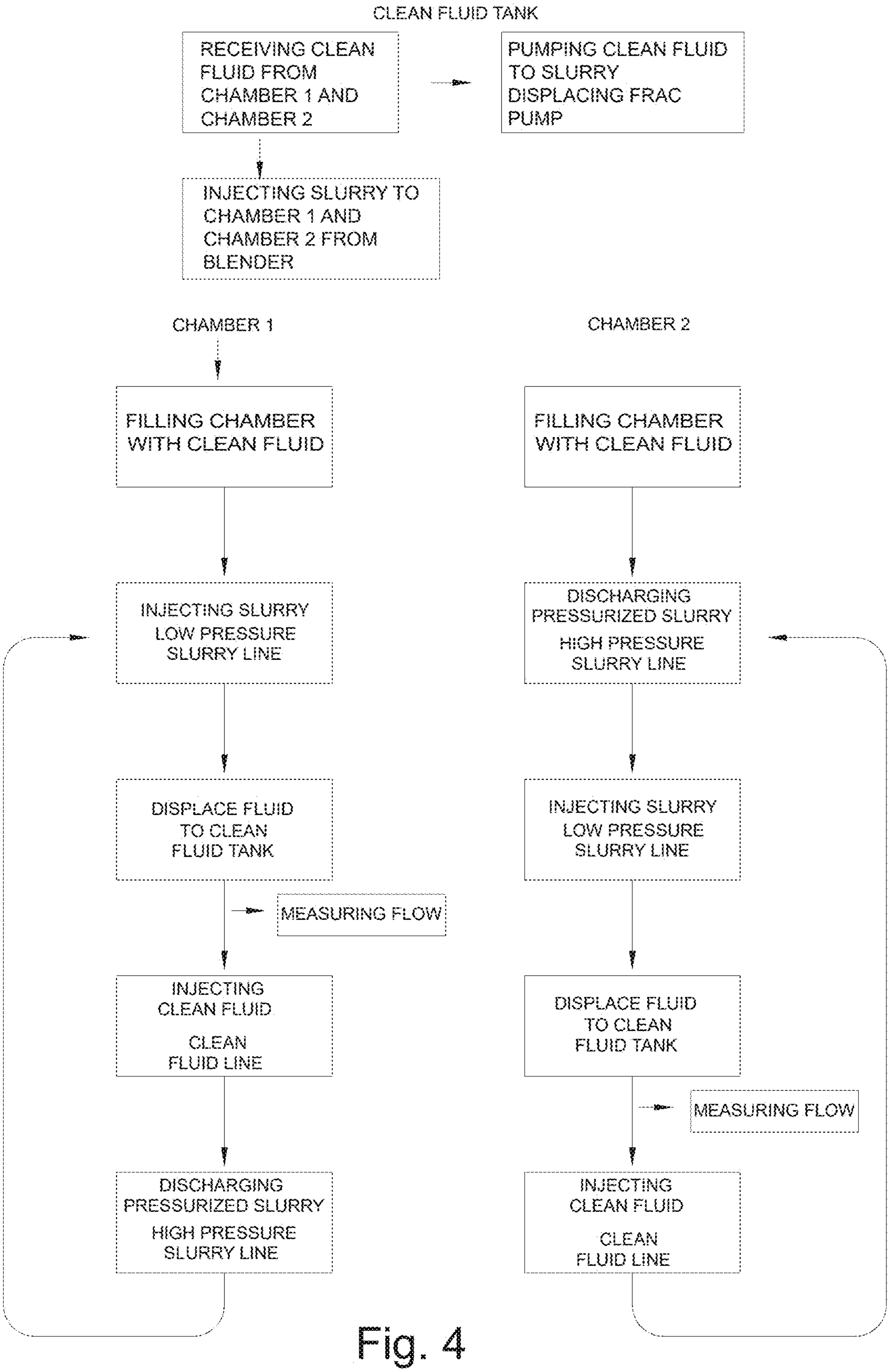
FIG. 4 is a block diagram of the method

The chambers 13 and 15 receive low pressure slurry which is a mixture of sand and clean fluid from the high density sand mixing blender 12 through the low-pressure slurry line 17. The high density sand mixing blender 12 receives sand S as shown in FIG. 3 as well as clean fluid from a clean fluid storage tank 6. Clean fluid line 7 is defined by the merger of outlet lines 45, 47 with flow meters 65, 67 and may include a sand trap 55 which guarantees the integrity of the fluid travelling to the frac pumps. The sand trap 55 may comprise a simple in-line filter 54 or any type of separation device capable of allowing fluid to pass but retaining a proppant such as sand. Upper outlets 45, 47 and upper inlets 49, 51 of at least 3 inch or greater diameter are secured along second or upper ends 12, 14 of the chambers 13, 15 and integrated with the cap ends for fluid transfer. The upper outlets 45, 47 are fluidly connected to logic control units and then to the clean fluid line 7 that supplies clean fluid from the clean fluid tank 6 to the high density sand mixing blender 12 and to a system charging pump 4 as shown in FIG. 2 and FIG. 3. The system charging pump 4 supplies clean fluid through a low pressure clean fluid line

53 to the slurry displacing frac pump (SDFP) and to the clean fluid frac pump (CFFP). The low-pressure clean fluid line 53 is connected to one or more pumps, as described above, the SDFP supplying high pressure clean fluid through a high pressure clean fluid line 56 to the upper inlets of both chambers and the CFFP supplying clean pressurized fluid to the high pressure slurry line 58 that supplies the wellhead W.

The chambers 13, 15 discharge fluid based on the logic control unit that includes valve actuators with actuator or control arms; and flow meters which are operatively connected to directional valves. The upper inlets 49 and 51 are fluidly connected to the SDFP through the high-pressure clean fluid line 56. The high-pressure line 56 is fluidly connected to a high-pressure discharge function of the SDFP and will be exposed to pressures of up to 15,000 psi and possibly higher with regulation by a valve actuator 61, control arms 63, 63' and directional valves. The directional valves may be either rotating, sliding or ball valves.

The low-pressure line 53 is connected to one or more pumps SDFP, CFFP, the chambers discharging fluid based upon synchronization by a logic control unit 2 that includes valve actuator 61 with actuator or control arms 63, 63'; flow meters 65 and 67 which are operatively connected to directional valves 57 and 59. The upper inlets 49, 51 are fluidly connected to the frac pumps P through a high-pressure clean fluid line 55. The high-pressure line 55 is fluidly connected to a high-pressure discharge function of pump P and will be exposed to pressures of up to 15,000 psi and possibly higher with regulation by the valve actuator 61, the control arms 63, 63' and the directional valves 57', 59'. The directional valves 57, 57' and 59, 59' may be either rotating or sliding valves.

The logic control unit comprises a programmable logic controller that is well known in the art and is used in conjunction with the actuator 61 to control the valves. The connection is preferably a wireless connection but the unit may be wired without departing from the scope of the disclosure. The unit assembly includes the flow meters 65, 67 to measure a flow of liquid through the valves and the actuator includes a module that receives data from the flow meters, and determines, based on data received from the flow meters, the position of the valves.

For example, in one exemplary form, the first chamber upper outlet valve will be in a closed position while the first chamber upper inlet valve will be in an open position. In this manner, the chambers will fill with slurry, clean fluid will be displaced from the chamber, travel through an optional sand trap 55 and into the clean fluid tank 6 to the high density sand mixing blender 12 or to the slurry displacing frac pump with the boost by the system charging pump 4. Pressurized clean fluid will be injected into each chamber from the SDFP, forcing the pressurized slurry into the wellhead. This pumping mechanism allows the clean fluid to be replenished while preventing the sand laden fluid or slurry from contacting the valves and seats of the frac pumps. The pressurization of the slurry is accomplished by the SDFP injecting clean fluid into the top of either chamber preventing contact by the slurry with the frac pumps valves, seats and plungers. The chambers are optimally operated in pairs for maximum efficiency on-site. Additional sets or pairs of chambers may be added to increase the volume of flow within a reduced period of time to the wellhead without departing from the scope of the disclosure.

In order for this system to work, the clean fluid is not recirculated as a closed loop through the system. This eliminates the possibility of the clean fluid overheating in a closed loop system. Further, this prevents job interruptions as a result of fluid leakages or sand contamination in the clean fluid. The current aspect allows for partial displacement of the slurry from the chamber to the well as a result of short strokes allowing for a portion of high density sand to be injected into the well. This can be a desirable result and is not possible with the existing technology or with clean fluid recirculating systems. The recirculating fluid method obligates the full displacement of the slurry on every stroke thus eliminating the possibility of short strokes. As the sand precipitates to the bottom, a much higher density slurry is created at the bottom of the chamber. A partial displacement of the fluid of the chamber will inject a section of higher sand density into the well.

An exemplary method discloses a method of pressurizing and discharging slurry into a wellhead, by first filling separately a first chamber with slurry and SDFP with clean fluid, the following two steps comprising injecting the slurry from the blender into a second chamber displacing its clean fluid back to the clean water source after passing through a sand trap, the slurry displacing frac pump receiving the volume of clean fluid from the clean water tank using the system charging pump, and injecting high pressure clean fluid into the first or second chamber displacing the volume of slurry in each chamber into the wellhead.

Once the entire volume of clean fluid of the first vessel has been displaced by slurry, the actuator will reverse the directional valves forcing slurry into the second vessel displacing clean fluid into a clean water source. The system charging pump delivers clean water to all pumps and the water fed to the frac pumps goes into the well diluting the high-density slurry while the clean fluid returning from the chambers, after having displaced the slurry, returns to the clean fluid supply tanks after passing through the sand trap.

In further detail, clean fluid is delivered by the blender 12 to both chambers 13, 15 and then to the frac pumps, completely filling the system with clean fluid. After venting all high points, the frac pumps will begin pumping and the flowmeters 65, 67 will monitor the flow through the system. The logic control unit, in conjunction with the flowmeters, will monitor the volume of clean fluid coming out of each vessel. The frac pumps will energize the clean fluid to the necessary pressure and then it is discharged to the chambers 13, 15 through the high-pressure clean fluid line 56 forcing the fluid in chamber one into the wellhead W. When the blender 12 begins to add sand into the fluid, the logic control unit will activate valve actuator and begin monitoring the volume of fluid leaving the chambers through the flowmeter. Once a volume of clean water has been registered by the flowmeter, the logic control unit will activate the valve actuator. The activation of the actuator may simultaneously close the two open valves and open the two previously closed valves. This will cause the high-pressure clean fluid to flow into the second chamber, displacing the slurry into the wellhead W. Simultaneously, the first chamber will receive slurry from the blender 12 displacing clean fluid through the logic control unit and the sand trap to the clean fluid tank. This process will repeat and if additional pairs of chambers are added to the system, the process is repeated but with increased volume passing through the system.

As the slurry is pumped into the chambers, the vertical or incline position of the chambers gravitationally forces the sand to the lower portion of each of the chambers. As sand falls to the lower end of the chamber, the fluid on the top of the chamber will be free of sand, further reducing the possibility of contaminating the clean fluid injected by the frac pumps. Further, the clean fluid used to displace the slurry from one vessel is provided to the clean fluid tank and then to the frac pumps or the blender pumping slurry into the chambers. This prevents sand from reaching the frac pump valves, seats, and fluid ends. This is further assisted by the vertical position of the vessels as gravity assists in keeping the sand away from the clean fluid.

Finally, as high-pressure clean fluid enters the top of a cylinder where the sand has accumulated at the bottom, even if it has achieved maximum concentration of 22.1 lbs./gals., the clean fluid will displace the slurry towards the wellhead as frac sand will always be permeable. The difference in pressure, if any, between the well pressure and the pressure required to open the discharge check valve of the cylinder will be proportional to the permeability of the sand being pumped into the well. This will provide a quality control of the sand being utilized. The clean fluid used in the system can also be of a different viscosity and composition if it is necessary to further separate the fluids.

For example, assuming that manufacturing the chambers from commercially available HHS tube of 20 in. diameter with 1.417 wall thickness and 100.1 inches in height, this system will pump 2.41 bbl./stroke. Introducing an 18 lbs./gal slurry it will require 1,000 strokes to pump 2,410 bbl. carrying 1,000,000 lbs. of sand or 1,000 lbs./stroke. To deliver the same amount of slurry by a standard plunger pump will require 185,295 strokes for a 4-inch diameter plunger and 10-inch stroke pump and 231,619 strokes for a 4-inch diameter plunger and 8-inch stroke pump. However, most frac jobs pump a much lower density slurry. Pumping a 3 lbs./gal. slurry it will take 9,014 bbl. of slurry to carry a 1,000,000 lbs. of sand requiring 613,404 strokes for the 10-inch stroke pump and 766,754 strokes for the 8 inches.

The example systems, methods, and acts described in the examples and described in the figures presented previously are illustrative, not intended to be exhaustive, and not meant to be limiting. In alternative examples, certain acts can be performed in a different order, in parallel with one another, omitted entirely, and/or combined between different examples, and/or certain additional acts can be performed, without departing from the scope and spirit of various examples. Plural instances may implement components, operations, or structures described as a single instance. Structures and functionality that may appear as separate in example embodiments may be implemented as a combined structure or component. Similarly, structures and functionality that may appear as a single component may be implemented as separate components. Accordingly, such alternative examples are included in the scope of the following claims, which are to be accorded the broadest interpretation to encompass such alternate examples. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. Apparatus for pressurizing and intermixing sand and fluid using a blender and frac pumps for discharge into a wellhead, comprising:

at least one pair of pressure chambers, each of first and second chambers adapted for vertical or semi-horizontal orientation;

at least one inlet line secured at a first end of each of said first chamber and said second chamber and in fluid communication with the blender;

at least one high pressure outlet line secured at said first end of each of said first chamber and said second chamber and in fluid communication with the wellhead;

at least one clean fluid outlet line secured to a second end of each said first chamber and said second chamber;

at least one high pressure clean fluid inlet line secured to said second end of each of said first and said second chamber and to a slurry displacing frac pump;

first valve members operatively connected to each of said inlet lines and each of said high pressure outlet lines proximal to said first end of each of said first chamber and said second chamber;

second valve members operatively connected to each of said outlet lines and each of said high pressure inlet lines proximal to said second end of each of said first chamber and said second chamber; and flow meters mechanically connected to each of said second end outlet lines and operatively connected to a logic control unit including at least one valve actuator, wherein the slurry displacing frac pump is configured to deliver pressurized clean fluid into the second end of the first chamber or the second chamber to volumetrically displace slurry from the first end of the first chamber or the second chamber through the at least one high pressure outlet line to the wellhead; and wherein the slurry displacing frac pump discharges clean fluid into a clean fluid frac pump that is in fluid communication with a high pressure slurry line joining with the at least one high pressure outlet line.

2. The apparatus according to claim 1 wherein the at least one clean fluid outlet lines from the first chamber and the second chamber converge to form a first clean fluid line.

3. The apparatus according to claim 2 wherein the first clean fluid line incorporates a filter member.

4. The apparatus according to claim 2 wherein the first clean fluid line feeds into a clean fluid storage tank.

5. The apparatus according to claim 4 wherein the clean fluid storage tank is in fluid communication with the blender.

6. The apparatus according to claim 4 wherein a second clean fluid line is in fluid communication with the clean fluid storage tank.

7. The apparatus according to claim 6 wherein the second clean fluid line is a low pressure clean fluid line that is in fluid communication with the slurry displacing frac pump.

8. The apparatus according to claim 6 wherein the second clean fluid line incorporates a system charging pump.

9. The apparatus according to claim 1 wherein each of the first and second chambers includes a mechanical plunger.

10. A system for injecting pressurized slurry into a wellhead, the apparatus having a blender unit and at least one fracturing pump, the system comprising:

dual elongated vertically or semi-vertically oriented chambers having upper and lower cap ends sealing each of the chambers;

at least one outlet and at least one high-pressure inlet proximal to an upper end of each of said dual chambers;

at least one inlet and at least one-high pressure outlet proximal to a lower end of each of said dual chambers;

the at least one high-pressure inlet circulating clean fluid from a slurry displacing frac pump to each of the dual chambers;

the at least one outlet circulating fluid from each of the dual chambers to a clean fluid storage tank;

each of the upper end inlets and outlets having corresponding valve members and each of the lower end inlets and outlets having corresponding valve members;

each of the valve members having a corresponding actuator with valve actuator arms and a logic control member operatively connected to flow meters, the valve members and the actuator, wherein pressurized clean fluid delivered by the slurry displacing frac pump into an upper end of a selected one of the dual chambers volumetrically displaces slurry from a lower end of the selected chamber through the at least one-high pressure outlet to the wellhead; and wherein the slurry displacing frac pump discharges clean fluid into a clean fluid frac pump that is in fluid communication with a high pressure slurry line joining with the at least one high pressure outlet.

11. The system according to claim 10 wherein the chambers each include a free-floating plunger.

12. A method of pressurizing and discharging slurry into a wellhead, the steps comprising:

filling a first vertical or semi-vertical chamber, a second vertical or semi-vertical chamber and at least one frac pump with clean fluid;

injecting slurry sequentially into a lower portion of the first chamber and the second chamber and sequentially displacing clean fluid from the first and second chamber away from the first and second chamber for downstream clean fluid handling;

measuring the flow of displaced clean fluid from the first and second chamber with a flow meter;

injecting pressurized clean fluid from the at least one frac pump into the first and second chamber to directly displace slurry from the chambers;

injecting clean fluid from a slurry displacing frac pump to a clean fluid frac pump; and discharging slurry sequentially from a lower portion of the first and second chamber through a high pressure slurry line into a wellhead.

13. The method of claim 12 wherein the steps further include discharging high pressure clean fluid from the clean fluid frac pump into the high pressure slurry line.

14. The method according to claim 12 whereby the steps are synchronized with a logic control unit, actuating valves, and flow meters.

15. The method according to claim 12 wherein the steps further include circulating clean fluid through the at least one slurry displacing frac pump to prevent slurry contact with the clean fluid frac pump.

* * * * *